3,179,938
HIGHLY DIRECTIVE ANTENNA SYSTEM
Dean D. Howard, 4230 Oak Lane, Oxon Hill, Md., and Bernard L. Lewis, 1673 Magnolia Ave., Winter Park, Fla.
Filed Nov. 28, 1961, Ser. No. 155,513
6 Claims. (Cl. 343—100)
(Granted under Title 35, U.S. Code (1952), sec. 266)

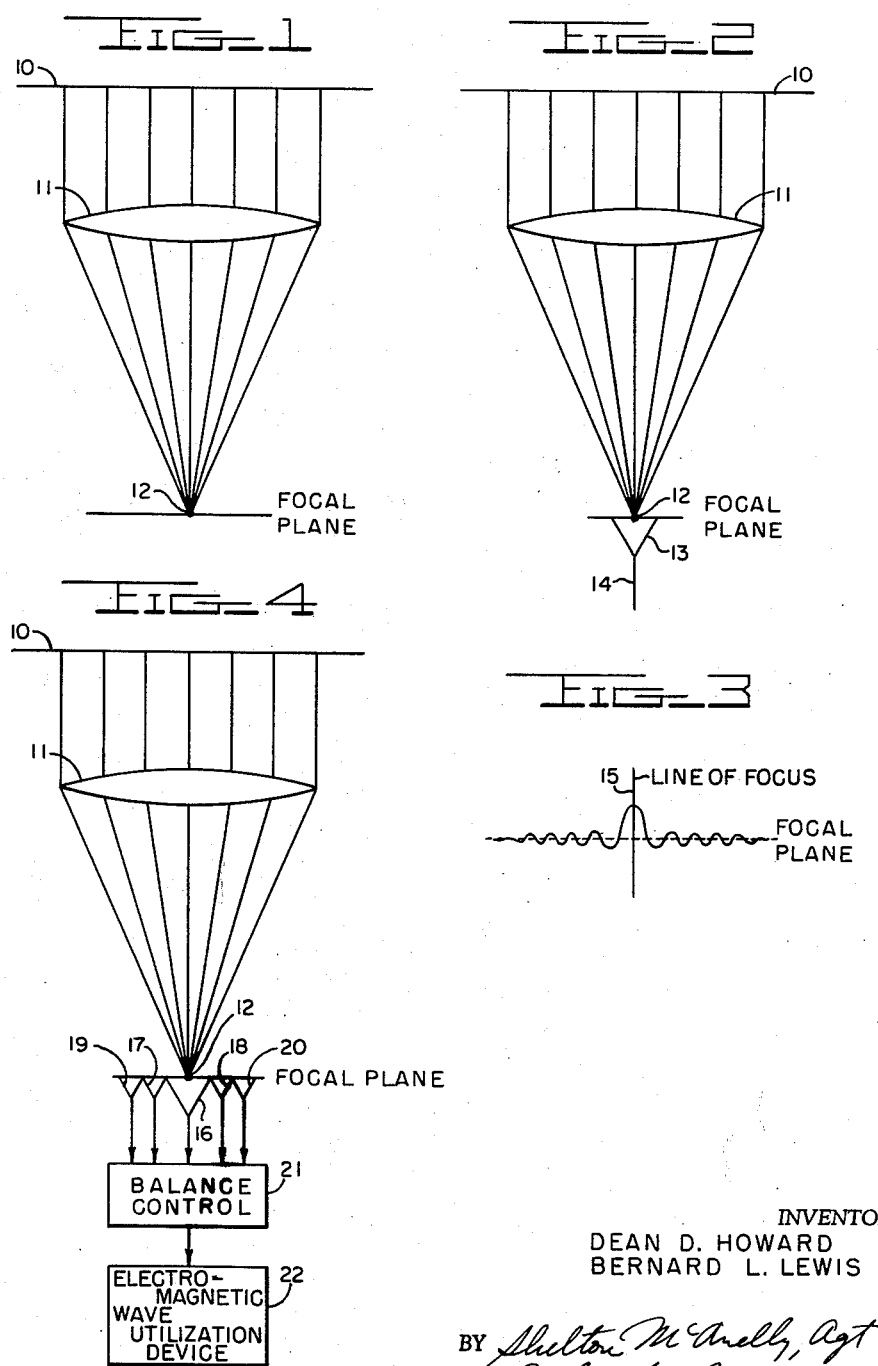

The invention described herein may be manufactured and used by or for the Government of the United States of America for governmental purposes without the payment of any royalties thereon or therefor.

This invention relates to antenna systems in general and in particular to directive antenna systems employing lens or reflective devices wherein improved reflector or lens illumination is possible in connection with narrower radiation patterns not possible in conventional prior systems of this type. For the purposes of the present invention conventional radar lens and reflector devices are equivalent and the terms are interchangeably used herein.

The operation of microwave lens and reflector devices is closely akin to optical devices as far as basic focusing and rejection properties and results are concerned. Although there are broad beam or searchlight types of microwave antennas for such purposes as communications, the narrow beam device offers peculiar problems which must be solved in certain applications such as radar systems where it is usually desirable to enhance angular resolution of objects by producing the narrowest possible beam width.

Point sources at infinite distance may be looked upon as producing incident plane wave energy. When this energy is focused by a lens of infinite diameter, all the energy is concentrated in a point called the focus. If the lens is less than infinite diameter, the energy is not concentrated to a single point but rather diffraction or interference effects occur resulting in the production in the focal plane of a central point near the focus surrounded by a series of concentric circles. The diameter of the circles having significant energy increases as the lens diameter increases relative to the wavelength of the energy involved. The mathematical function of this energy is known as a $$\frac{\sin x}{x}$$

function and is shown in "cross section" in FIG. 3. It should be recognized that the function $$\frac{\sin x}{x}$$

is merely a convenient mathematical approximation of physical realities and as such is subject to varying degrees of inaccuracies caused by the physical parameters of the antenna system. Likewise, the term $x$ is related to the wavelength and physical dimensions of the lens or reflecting device of the system. In general, however, values of $x$ are obtainable from measurements of the antenna radiation pattern. A discussion of the theory and the influence of the physical parameters of a parabolic reflector can be found beginning at page 942 in Principles of Radar by M.I.T. Staff, Third Edition by Reintjes and Coate.

At microwave frequencies, lens diameters must be, relatively speaking, rather small in terms of numbers of wavelength of the energy involved.

Thus point sources, such as distant energy reflective objects, actually produce energy in the lens focal plane which is spread over an area way out of proportion to the actual size of the distant reflective object.

On the other hand, it is virtually impossible to obtain an efficient pick-up device for location in the focal plane which is sensitive at only a point. Usually, the sensitivity must be significantly larger than a point. The net result is an unavoidable limitation on the ultimate angular resolution and angular accuracy in determining the location of the distant object.

Furthermore, in the actual illumination of the distant object to produce the return, only a point source could provide a plane output wave yet a point source device even if available would radiate uniformly in all directions so that a large part of the energy radiated thereby would not fall on even a very large lens for focusing into the plane wave. The result is low efficiency on transmission and poor voice rejection on reception since the point source radiator is, by reciprocity, sensitive to incoming energy from directions other than through the lens.

Thus, a number of difficulties of prior art systems such as that of FIG. 2 employing a lens or a parabola as a secondary aperture device illuminated by the single horn as a primary radiator disposed at the focus of the secondary radiator become apparent.

(1) The transmitter beam is broader than optimum.
(2) Side lobes produced.
(3) Receiver angular resolution less than optimum.

Since the above characteristics of the conventional prior art systems are to a greater or lesser extent undesirable in many, if not all, instances, it is an object of the present invention to provide an improved antenna system in which the normal diffraction characteristics of the conventional primary radiator-secondary radiator system can be utilized to advantage.

Another object of the present invention is to provide an antenna system employing primary and secondary apertures wherein the primary aperture is arranged in the form of a plurality of horns whose coupling characteristics can be proportioned to utilize to advantage the $$\frac{\sin x}{x}$$

pattern resulting from diffraction phenomena.

Another object of the present invention is to provide an antenna system in which energy emitted by a horn type primary radiator system is proportioned in such a way to result in the production of a plane wave output from secondary aperture portions of the antenna system.

Another object of the present invention is to provide an antenna composed of a plurality of horns without a secondary element and which provides an unusually square shaped beam pattern with small side lobes capable of a high degree of rejection of signal sources outside the beam and uniform response to signals within the beam.

Other objects and many of the attendant advantages of this invention will be readily appreciated as the same becomes better understood by reference to the following detailed description when considered in connection with the accompanying drawings wherein:

FIG. 1 shows a basic situation of a lens system focusing incoming plane wave energy to a point source or conversely, producing outgoing plane wave energy by illumination from a point source.

FIG. 2 indicates substantially the same material as FIG. 1 but showing the prior art schematic placement of a single feed horn in proximity to the focus of the lens device.

FIG. 3 indicates in general the $$\frac{\sin x}{x}$$

shaped function referred to in connection with the present application.

FIG. 4 indicates apparatus constructed in accordance with the teachings of the present invention employing a plurality of horns of appropriate configurations together with an appropriate coupling device to the horns whereby the desired properties of the present invention can be realized.

In accordance with the basic teachings of the present invention, an antenna system is provided wherein improved power efficiency, reduced beam width, and reduced background interference are obtained by employing a plurality of components as the primary aperture coupled to a secondary aperture whereby $$\frac{\sin x}{x}$$

shaped electric field coupling to the secondary aperture is obtained. The result of this $$\frac{\sin x}{x}$$

coupling is that the system when employed for reception of an incoming electromagnetic wave causes the secondary aperture to focus incident wave energy upon the region of the primary aperture in such a manner that $$\frac{\sin x}{x}$$

coupling is utilized to advantage for improving angular resolution and background noise pickup from undesired directions. In a reciprocal manner, if the antenna system is employed for transmission purposes, the field at the primary aperture region is produced in a $$\frac{\sin x}{x}$$

manner so that the output from the secondary aperture is obtained as a planar electromagnetic wave of a narrower width than is possible with prior art systems. The amount of energy from the primary aperture spilling over beyond the sides of the secondary aperture without actually being focused thereby in passage is held to a minimum that is far less than in the prior art. While the advantages obtained by this invention are, of course, desirable in all radar systems, it will be evident that such advantages are of the greatest importance in radar systems which strive for the utmost in precise angular resolution at maximum range.

With reference now to FIG. 1 of the drawing, the showing therein indicates in general the result obtained when an incident plane wave which is represented by line 10 falls upon a focusing device indicated for simplicity as a lens 11 having suitable refractive or focusing properties for the purpose desired. The incident wave is brought to a point focus only by a lens of infinite diameter and for anything less, a series of concentric rings is formed around the central spot due to diffractive effects. The showing of the lens is made for simplicity in the drawing of the various parallel and converging lines indicative of the focusing action of the secondary aperture on the incoming plane however a parabolic reflector is also a conventionally employed component of such system.

FIG. 2 indicates a development of the basic lens arrangement of FIG. 1 as employed in the prior art in which a single horn 13 shown schematically is placed in the region of the focus 12, the horn being proportioned so as to be of a size such as the width of the center main lobe of the $$\frac{\sin x}{x}$$

pattern in the focal plane to produce the best compromise in the coupling of the incident wave energy to a suitable transmission line 14 that is possible with the prior art technique. It is again observed that the lens 11 has a focal point 12 located in a focal plane in which the incident plane wave converges to a $$\frac{\sin x}{x}$$

shaped electric field.

FIG. 3 indicates a presentation of the $$\frac{\sin x}{x}$$

function which can be considered a "cross-section" characteristic of the distribution of signal intensities and polarities in the plane of the focus 12 when a lens is of finite size relative to the wavelength of energy involved. If a horn is employed which couples to the principal central loop of the $$\frac{\text{six } x}{x}$$

pattern and also to the first loop on each side thereof it is evident that the coupling will include not only the positive coupling on the first loop but also the negative coupling on the first offset loop to each side of the center loop. The result of this negative coupling is a reduction of the efficiency of the over all system and the acceptance of energy from directions other than perpendicular to the plane of the incident wave. To minimize this is the reason that in prior art usage the single horn is normally proportioned to restrict the pickup to only the main loop of the $$\frac{\sin x}{x}$$

pattern thus effectively throwing away the energy contained in the side loops.

The foregoing discussion of FIGURES 1, 2 and 3 although primarily developed through a discussion of the reception of incident plane waves because of the convenience of discussing focusing characteristics, can also be applied with suitable reciprocity considerations to the transmission of electromagnetic wave energy applied to the horn 13 to produce outgoing electromagnetic wave energy. The proportions of the components of the horn lens assembly is ordinarily stated somewhat differently for transmission but actually the two characteristics usually most important on transmission are the reduction of spillover loss of energy from the horn which does not pass through the lens 11 and the obtaining of uniform illumination of the secondary aperture 11 to produce minimum beam width. These two conditions are not usually optimized with the same physical arrangement. Thus the coupling of the horn 13 to the secondary aperture 11 is normally not optimum from any view point and there will be a reduction in the intensity of the energy in the outgoing wave in comparison to what it could be without the $$\frac{\sin x}{x}$$

diffraction situation caused by the finite lens or parabola size which, of course, was unavoidable in the prior art. Actually, the horn of the prior art arrangement is usually proportioned for both transmission and reception in the manner set forth for reception as coupling to the center loop of the $$\frac{\sin x}{x}$$

diffraction pattern of the lens or parabola.

With reference now to FIG. 4, the apparatus shown therein represents an improvement constructed in accordance with the teachings of the present invention. As with the previous FIGS. 1 and 2, an indication is made of a plane wave front 10, it being understood that this could be an incoming wave for incident energy or the front of an outgoing wave for transmitted energy. In addition, FIG. 4 shows a secondary aperture device 11 as a lens system. As in previous figures, the focus for the lens 11 is indicated by reference character 12.

Instead of the single horn 13 of FIG. 2 the apparatus in FIG. 4 contains a plurality of horns in close proximity containing a first central horn 16, a pair of secondary horns 17 and 18, and a pair of tertiary horns 19 and 20, single line convention being used to indicate conventional radio frequency transmission lines such as a wave guide. The horns 16 to 20 are connected to the balance control device 21, which is simply a collection of known apparatus components capable of combining signals with selectable phasing and amplitude. The coupling of the horns is phased in the balance control device 21 to provide maximum constructive addition of the energy in the five center lobes in the $$\frac{\sin x}{x}$$

shaped electric field.

The balance control 21 is connected to an electromagnetic wave utilization device 22 which in accordance with the foregoing discussion could be a receiver or a transmitter depending upon the particular utility desired for the apparatus. In some instances, such as a radar system, it is possible that the device would contain both a transmitter and a receiver, together with a suitable duplexing apparatus to provide for the required alternation between transmitting and reception as is customary in such radar devices.

The horns 16 through 20 are arranged in a very specific configuration in order to obtain the results desired for the apparatus of the present invention. Specifically, the horns are proportioned in accordance with the relationship of the diameter and the focal length of the lens 11 which control the width of the central portion or lobe of the $$\frac{\sin x}{x}$$

pattern of FIG. 3. Actually the horn 16 is made approximately equal to the width of the central loop of the $$\frac{\sin x}{x}$$

pattern between the intersection thereof with the horizontal axis shown as the focal plane.

The horns 17 and 18 are proportioned with regard to the characteristics of the lens system to produce individual horn widths approximately equal to the width of the first negative loops of the $$\frac{\sin x}{x}$$

pattern of FIG. 13 as measured along the focal plane. Likewise, the horns 19 and 20 are proportioned so as to correspond to the second or "positive" loops on each side of the main loop. As a practical matter, the horn 16 is normally twice the width of the side horns 19, 17, 18, 20.

In further elaboration, the balance control 21 is adjusted to achieve a condition wherein the energy of the horns 17 and 18 is coupled in a polarity opposite to that for the horns 16 and 19 and 20 because of the different polarity of the loops of the $$\frac{\sin x}{x}$$

pattern to which the various horns couple. In addition, as to amplitude of the couplings to the various horns, the balance control 21 is adjusted where the coupling of the horns 16, 17, 18 and 19 bears substantially the same relationship as in the crests of the loops of FIG. 3 to which the individual horns correspond. Thus, the arrangement of the various horns provides $$\frac{\sin x}{x}$$

excitation or illumination of the secondary aperture 11 which in a transmission device would produce a plane wave 10 of very narrow beam width and wherein there is a minimum of energy from the horns which does not intercept the secondary aperture 11 in the normal configuration. On reception, the plane wave 10 couples to the combined horn system to provide far more efficient coupling than is available in the prior art.

It should be borne in mind that although FIG. 4 indicates a total quantity of five horns being used, actually a greater or lesser number of horns could be used with the same objective of fitting the electric field of the over all horn configuration to the $$\frac{\sin x}{x}$$

shaped electric field of the secondary aperture. Usually, the more horns the greater the improvement, which is, of course, at the expense of greater apparatus complexity.

The showing of FIG. 4 is essentially a one plane showing which would provide the $$\frac{\sin x}{x}$$

characteristics only in a single plane, say the horizontal plane, of the over all system. Since the $$\frac{\sin x}{x}$$

characteristics may be advantageous in the vertical plane as well as the horizontal plane, the row of horns 19, 17, 16, 18, and 20 may be supplemented by additional horns to form a vertical row of horns including horn 16 which will provide a similar $$\frac{\sin x}{x}$$

pattern in the vertical plane. This would provide a first approximation to an area $$\frac{\sin x}{x}$$

coverage which could be extended by the addition of other horns to improve the area coverage, other horns being added to and arranged to duplicate the diffraction fields involved at the various positions in the focal plane. The dimensions of the horns are dictated primarily by the $$\frac{\sin x}{x}$$

function or the particular focal characteristics of the secondary aperture device 11 and the location of the horn within the diffraction pattern.

An improvement over single horn operation as regards side lobe reduction and uniform illumination over the beam is possible without a secondary device such as a lens or reflector by employing the feed horn cluster of FIG. 4. In each case the horns themselves are proportioned to produce the width of beam desired, normally being larger than those used with the secondary aperture device. The two to one proportion of the center horn relative to the others is maintained as is the amplitude and phasing of the coupling by the balance control 21.

Obviously many modifications and variations of the present invention are possible in the light of the above teachings. It is therefore to be understood that within the scope of the appended claims the invention may be practiced otherwise than as specifically described.

What is claimed is:

1. In combination, an electromagnetic wave utilization device, a first radiator device having selected pattern characteristics with regard to the propagation of electromagnetic wave energy, a plurality of additional radiator devices disposed adjacent to said first radiator device, each having approximately half the linear extent of the first radiator device and an efficient coupling device at the frequencies involved, and means for adjusting the polarity and amplitude of the coupling of the radiator devices to the electromagnetic wave utilization device, whereby the relative contributions of the radiator devices substantially correspond to their locations relative to a $$\frac{\sin x}{x}$$

distribution.

2. In combination, an electromagnetic wave utilization device, a first radiator device having selected pattern characteristics with regard to the propagation of electromagnetic wave energy, a plurality of additional radiator devices disposed adjacent to said first radiator device, each having approximately half the linear extent of the first radiator device and an efficient coupling device at the frequencies involved, an electromagnetic wave focusing device for controlling pattern characteristics of the radiator devices in a selected manner, and means for adjusting the polarity and amplitude of the coupling of the radiator devices to the electromagnetic wave utilization device, whereby the relative contributions of the radiator devices substantially correspond to their locations relative to a $$\frac{\sin x}{x}$$

distribution.

3. In combination, an electromagnetic wave utilization device, a first radiator device having selected pattern characteristics with regard to the propagation of electromagnetic wave energy, a plurality of additional radiator devices disposed adjacent to said first radiator device, each having approximately half the linear extent of the first radiator device and an efficient coupling device at the frequencies involved, an electromagnetic wave lens disposed in proximity to said radiator devices such that the radiator devices are located substantially in the focal plane of the lens, and means for adjusting the polarity and amplitude of the coupling of the radiator devices to the electromagnetic wave utilization device, whereby the relative contributions of the radiator devices substantially correspond to their locations relative to a $$\frac{\sin x}{x}$$

distribution.

4. In combination, an electromagnetic wave utilization device, a first radiator device having selected pattern characteristics with regard to the propagation of electromagnetic wave energy, a plurality of additional radiator devices disposed adjacent to said first radiator device, each having approximately half the linear extent of the first radiator device and an efficient coupling device at the frequencies involved, an electromagnetic wave focusing device disposed in proximity to said radiator devices such that the radiator devices are located substantially in the focal plane of the focusing device, and means for adjusting the polarity and amplitude of the coupling of the radiator devices to the electromagnetic wave utilization device, whereby the relative contributions of the radiator devices substantially correspond to their locations relative to a $$\frac{\sin x}{x}$$

distribution.

5. In combination, an electromagnetic wave utilization device, a first horn antenna having selected pattern characteristics with regard to the propagation of electromagnetic wave energy, a plurality of additional horn antennas disposed adjacent to said first horn antenna, each having approximately half the linear extent of the first horn and an efficient coupling device at the frequencies involved, and means for adjusting the polarity and amplitude of the coupling of the horns to the electromagnetic wave utilization device, whereby the relative contributions of the horns to the total correspond in polarity and amplitude to their locations relative to a $$\frac{\sin x}{x}$$

distribution.

6. In combination, an electromagnetic wave utilization device, an electromagnetic wave lens for producing a selected focusing effect of electromagnetic wave energy, a first horn radiator disposed substantially on the focus of the lens, said first horn having a linear extent approximating the center loop of the $$\frac{\sin x}{x}$$

diffraction pattern of the lens, a plurality of additional horn radiators disposed about said first horn substantially in the focal plane of the lens, said additional horns being disposed individually in selected parts of selected loops of the $$\frac{\sin x}{x}$$

pattern of the lens, each having a linear extent approximating the width of the corresponding loop of the $$\frac{\sin x}{x}$$

pattern, and means for coupling the horns to the electromagnetic wave utilization device in polarity and amplitude corresponding to their locations relative to the $$\frac{\sin x}{x}$$

diffraction pattern of the lens.

References Cited by the Examiner
UNITED STATES PATENTS
3,158,862   11/64   Chisholm _____ 343—6.8

CHESTER L. JUSTUS, *Primary Examiner.*